United States Patent
Jimenez-Feltström

(10) Patent No.: US 7,035,801 B2
(45) Date of Patent: Apr. 25, 2006

(54) TEXT LANGUAGE DETECTION

(75) Inventor: Alberto Jimenez-Feltström, Fuengirola (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 466 days.

(21) Appl. No.: 09/945,663

(22) Filed: Sep. 5, 2001

(65) Prior Publication Data

US 2002/0095288 A1    Jul. 18, 2002

(30) Foreign Application Priority Data

Sep. 6, 2000    (GB)    .................................... 0021869

(51) Int. Cl.
*G10L 15/26* (2006.01)

(52) U.S. Cl. ...................... 704/255; 704/256; 704/257; 704/8; 704/9

(58) Field of Classification Search ................ 704/260, 704/277, 257, 9, 2, 278; 717/1; 382/229, 382/228; 395/600, 757
See application file for complete search history.

(56) References Cited

U.S. PATENT DOCUMENTS

| | | | |
|---|---|---|---|
| 4,829,580 A | | 5/1989 | Church |
| 5,062,143 A | | 10/1991 | Schmitt |
| 5,418,951 A | * | 5/1995 | Damashek ...................... 707/5 |
| 5,724,593 A | * | 3/1998 | Hargrave, III et al. .......... 704/7 |
| 5,768,603 A | | 6/1998 | Brown et al. |
| 5,862,259 A | * | 1/1999 | Bokser et al. ............... 382/228 |
| 6,157,905 A | * | 12/2000 | Powell ........................... 704/2 |
| 6,321,372 B1 | * | 11/2001 | Poirier et al. ................ 717/122 |
| 6,658,151 B1 | * | 12/2003 | Lee et al. .................... 382/229 |
| 2001/0027394 A1 | | 10/2001 | Theimer |
| 2004/0128144 A1 | * | 7/2004 | Johnson et al. .............. 704/278 |

FOREIGN PATENT DOCUMENTS

| | | |
|---|---|---|
| EP | 0621542 A2 | 10/1994 |
| EP | 0672988 A2 | 9/1995 |
| EP | 0849925 A1 | 6/1998 |
| EP | 0849925 A2 | 6/1998 |
| EP | 0889626 A1 | 1/1999 |

(Continued)

OTHER PUBLICATIONS

Shannon, C.E.: "The Mathematical Theory of Communication", MD Computing, Springer, New York, NY, US, vol. 14, No. 4, 1997, pp. 306-317, XP000856516.

(Continued)

*Primary Examiner*—Susan McFadden
(74) *Attorney, Agent, or Firm*—Potomac Patent Group PLLC

(57) ABSTRACT

A method of determining the language of a text message received by a mobile telecommunications device indicates receiving an input text message at a mobile telecommunications device; analyzing the input text message using language information stored in the mobile telecommunications device; selecting, from a group of languages defined by the language information, a most likely language for the input text message; and outputting, from the mobile telecommunications device, speech signals corresponding to the input text message, in the selected language.

9 Claims, 3 Drawing Sheets

| | FOREIGN PATENT DOCUMENTS | | |
|----|----|----|----|
| EP | 0889628 | A2 | 1/1999 |
| EP | 0984427 | A2 | 3/2000 |
| EP | 1014276 | A2 | 6/2000 |
| EP | 1113420 | A2 | 7/2001 |
| JP | 10320399 | | 12/1998 |
| WO | WO97/43707 | | 11/1997 |

OTHER PUBLICATIONS

Shannon, C.E.: "The Mathematical Theory of Communication", MD Computing, Springer, New York, NY, US, vol. 14, No. 4, 1997, pp. 306-317, XP000856516.

* cited by examiner

TEXT LANGUAGE DETECTION

FIELD OF THE INVENTION

The present invention relates to text language detection, and in particular to methods for detecting the language of text message in a mobile telecommunications system, for example an SMS message, an e-mail or a WAP page.

BACKGROUND OF THE INVENTION

A Text To Speech (TTS) system is a device for translating text to audio signals. Due to the fast development of the semiconductor industry, these systems are today entering the consumer electronics market. In particular, these systems are today being implemented in Personal Computers (PCs), Personal Digital Assistants (PDAs), Mobile Phones (MPs) and Car Accessories (CAs).

One of the most desirable applications for a TTS system is in car hands-free equipment for mobile telephones. Today, mobile phones have the possibility of receiving so-called SMS (short message service) text messages. Through these SMS messages, text can be transmitted to a specific mobile subscriber. The messages can be created and edited, for example, in another mobile telephone or in an e-mail editor at a PC. SMS messages can also be used for transmission of traffic information and other news and data.

SMS messages are normally represented in a display of the mobile telephone and the user has to read them from there. However, there are many situations where reading the display can be difficult and even dangerous. In a car hands-free situation, for example, the driver may not be able to read the display contents since he/she has to concentrate on the road. For this reason, there are now law restrictions on using mobile phones while driving. Text to speech conversion is a good solution to overcoming the restriction. The TTS reads the text for the user through the loudspeaker.

However, a problem with currently available systems is that they normally support only one language. In some more advanced equipment, the user must choose manually the language to use by the TTS system. However, since different languages have different pronunciations of the alphabet, a message in one language can be unintelligible if spoken by a system designed for another language.

It will be readily appreciated that similar comments apply to text received in the form of e-mails, WAP (Wireless Application Protocol) pages or other text systems, in addition to SMS messages.

SUMMARY OF THE PRESENT INVENTION

One embodiment of the present invention provides means for automatically detecting the incoming language by inspecting statistics of the text. By analyzing text string statistics, for example character frequency and temporal dependency of characters, the language used can be estimated or recognised recognized. This analysis is done before feeding the TTS system with the incoming text string.

It is emphasized that the term "comprises" or "comprising" is used in this specification to specify the presence of stated features, integers, steps or components, but does not preclude the addition of one or more further features, integers, steps or components, or groups thereof.

According to one aspect of the present invention, there is provided a method of determining the language of a text message received by a mobile telecommunications device, the method comprising:

receiving an input text message at a mobile telecommunications device;

analyzing the input text message using language information stored in the mobile telecommunications device;

selecting, from a group of languages defined by the language information, a most likely language for the input text message; and outputting, from the mobile telecommunications device, speech signals corresponding to the input text message, in the selected language.

According to another aspect of the invention, there is provided a method of determining the language of a text message, the method comprising:

receiving an input text message comprising a plurality of characters;

for each character, except the last in the message, determining respective probability values for selected languages, each probability value being indicative of the probability that the character concerned is followed by the next character in the message in the language concerned;

for each language, accumulating the probability values determined for each character in the message; and determining the language of the text message on the basis of the accumulated probability values.

According to another aspect of the invention, there is provided a method of determining the language of a text message, the method comprising:

receiving an input text message comprising a plurality of characters;

defining a plurality of groups of n characters in the message;

for each character group, except the last in the message, determining respective probability values for selected languages, each probability value being indicative of the probability that the character group concerned is followed by the next character group in the message in the language concerned;

for each language, accumulating the probability values determined for each character group in the message; and determining the language of the text message on the basis of the accumulated probability values.

According to another aspect of the invention, there is provided a method of determining the language of an incoming text message, the method comprising:

receiving an incoming text message which comprises a plurality of words;

comparing each word with each of a plurality of language models relating to respective languages;

for each language, recording the number of words that match words stored in the language models;

selecting the language of the text message on the basis of the language model having the highest number of word matches.

According to another aspect of the invention, there is provided a mobile telecommunications device comprising:

a receiver for receiving input text message;

a storage unit for storing language information;

a text message analyzer for analyzing received input text messages using language information stored in the storage unit; and a speech output unit for outputting speech signals relating to a received input text message, in a language determined by the text message analyzer.

DETAILED DESCRIPTION OF THE PREFERRED EMBODIMENT

Figure 1:
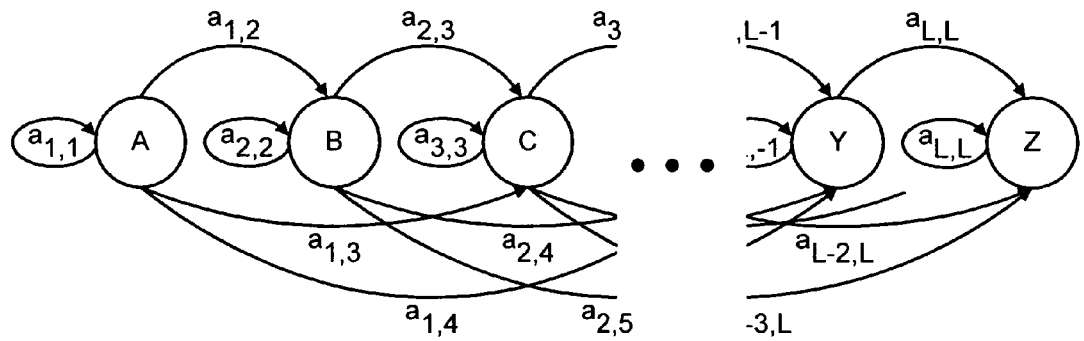
FIG. 1 illustrates a Discrete Markov Model.

In the 1940's, information theorists discovered that a Discrete Markov Model (DMM) could generate strings of characters that are very similar to the English language, see e.g. Shannon, CE (1948), *A Mathematical theory of Communication*, Bell Sys Tech. In the simplest models, a DMM was used where the states $S=\{s_i: i=1, \ldots, L\}$ represented the set of the L characters of the alphabet S and the transition probabilities $$\{a_{si,sj}\}_{i,j=1}^{L}$$

modelled the relative frequency that a character $S_j$ follows a character $S_i$. For example see the transition diagram of FIG. 1. In FIG. 1, not all possible transitions have been shown in order to improve the clarity of the Figure. Each capital letter (A, B, C . . . ) Represents a state (for single letters the characters themselves), and $a_{i,j}$ represents the probability of changing from state i to state j.

Better models can be obtained by letting the states represent bigrams or trigrams, i.e. pairs or triplets of characters. In the general case, n-grams, i.e. a group of n characters, can be used.

In the present invention these DMM results are used in the opposite direction. That is, a set of DMMs, modeling respective languages, are used to analyze the received text string and calculate which model could have produced the string. Once the appropriate model has been found, the corresponding language is selected for use by the TTS system.

Since the mathematics are fundamentally the same, whether the DMM states represents single characters, bigrams or trigrams, the following description of a method embodying the invention relates to the use of single characters. It will be readily appreciated that the description holds for the bigrams, trigrams and n-grams.

In mathematical terms, the problem of finding the most probable language can be formulated as follows:

Let $\Lambda_m$, $(m=1, \ldots, M)$ represent M different DMMs, each of one representing one of the M specific languages and let $\bar{u}=[u_1, \ldots u_N]$ be a vector consisting of N ASCII characters (representing the incoming message). $Pr(\Lambda|\bar{u})$ is defined to be the probability that a given language was used to generate the incoming text message, conditioned on the knowledge of $\bar{u}$. Then, the maximum a-posteriori language selection $\hat{\Lambda}$ is given by solving equation (i):

$$\hat{\Lambda} = arg \max_{1 \leq m \leq M} Pr(\Lambda_m | \bar{u}) \qquad (i)$$

It will be appreciated that if the string $\bar{u}$ has itself been generated by a DMM that it is possible to show that this is an optimum solution.

Using Bayes Theorem for conditional probabilities, the same solution is obtained by solving:

$$\hat{\Lambda} = arg \max_{1 \leq m \leq M} Pr(\bar{u} | \Lambda_m) p(\Lambda_m), \qquad (ii)$$

where $p(\Lambda_m)$ is the a-priori probability than language $\Lambda_m$ has been used in the generation of u.

In order to solve this equation, let $$\{a_{sj,sj}^{(m)}\}_{i,j=1}^{L}$$

be the transition probabilities for the language model $\Lambda m$ and $q_{sj}^{(m)}$ be the probability that a text string starts in language m with the character $s_j$. Then, we have $$\hat{\Lambda} = arg \max_{1 \leq m \leq M} p(\Lambda_m) q_{u_1}^{(m)} \prod_{i=1}^{N-1} a_{u_i,u_{i+1}}^{(m)} \qquad (iii)$$

An equivalent solution can be obtained by using the logarithms of the Probabilities (LP). In this case we have equation (iv):

$$\hat{\Lambda} = arg \max_{1 \leq m \leq M} \log(p(\Lambda_m)) + \log(q_{u_1}^{(m)}) + \sum_{i=1}^{N-1} \log(a_{u_i,u_{i+1}}^{(m)}) \qquad (iv)$$

In a practical implementation of the invention, the values of LPs are pre-stored in DMM lookup tables for respective language models.

Figure 2:
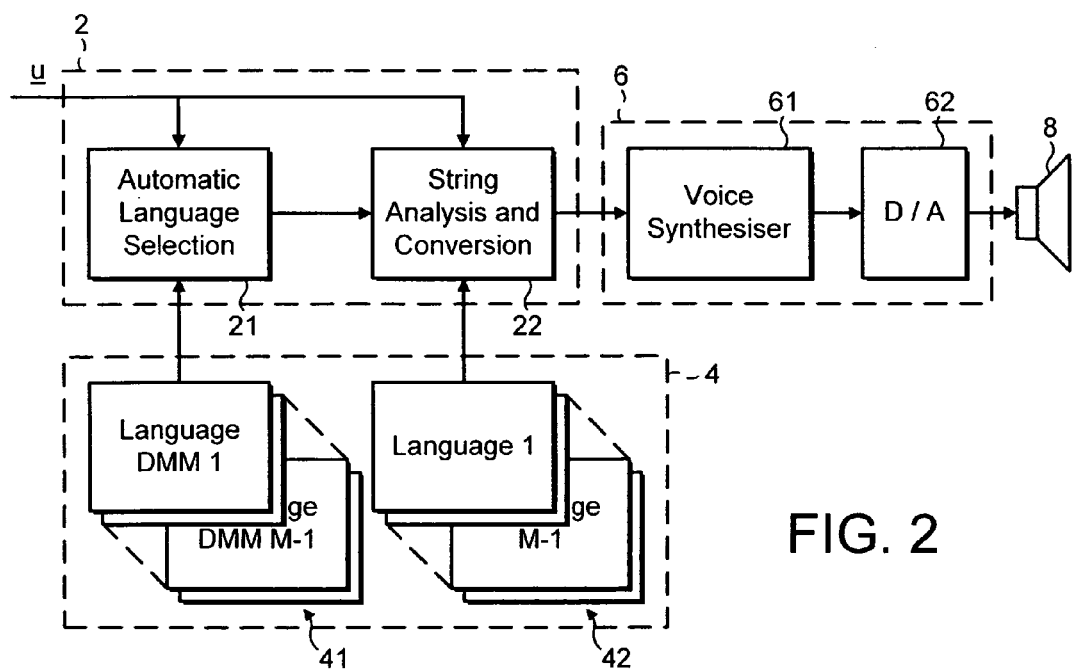
FIG. 2 illustrates a language detection apparatus.
Figure 3:
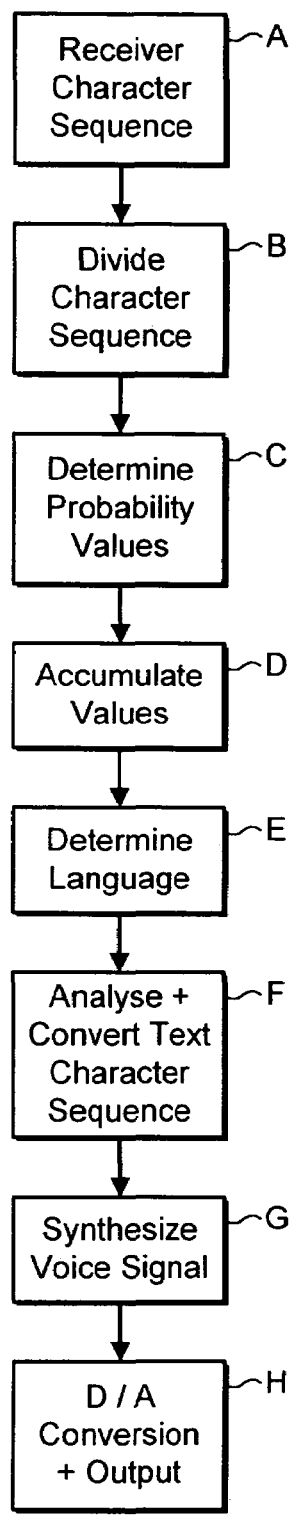
FIG. 3 illustrates a language detection method.

FIG. 2 illustrates a system for detecting the input language and for reading out the text message in the detected language. The system of FIG. 2 includes a processing unit 2, a storage unit 4, an output unit 6 and an output speaker 8. The processing unit 2 includes a language selection unit 21 which is operable in accordance with the present invention to determine the language of an input text character sequence $\underline{u}$. Operation of the system of FIG. 2 will now be described with reference to FIG. 2 and the flowchart of FIG. 3.

The input character sequence $\underline{u}$ is received by the selection unit 21 (step A), which divides the sequence into a series of n-grams (i.e. groups of n characters) (step B). For the sake of clarity, the system will be described with n=1, i.e. individual characters, but it will be readily appreciated that the number of characters in, a group can be chosen arbitrarily. For example, n=2 or 3 can provide useful results.

For each pair of characters (i.e. a character and the next in the sequence), a probability value $a_{i,j}$ is determined by reference to predefined language models 41 stored in the storage unit 4 (step C). This probability value is indicative of the probability of occurrence of the pair of characters in the language concerned. As described above, the probability values are determined by a discrete Markov model (DMM) of the language concerned. Preferably, the probability values are stored as logarithms of probabilities (LP).

The retrieved probability values are accumulated for each language model by the processing unit. In the case of simple probability values, the accumulation is performed according to equation (iii) above. In the preferred embodiment using LPs, the accumulation is performed by using equation (iv) above. When all of the probability values for the character sequence have been accumulated, each language model will have an aggregate probability value. The most likely language is then determined by evaluating equation (iii) or (iv) (step E). The language model that produces the larges accumulated probability value is regarded as the most likely language of the incoming text message. The task of the microprocessor 2 is to accumulate the corresponding probabilities according to the received text string u for all M languages and select the most probable language. Thereafter, the most probable language is selected and the language specific code is chosen for string analysis and conversion.

The analysis and conversion unit 22 receives notification of the determined language from the selection unit 21 and then converts the character sequence to appropriate voice signals with reference to language-dependent code 42 stored in the storage unit 4. The voice signals are then processed by a voice synthesiser 61 (step G) and D/A converter 62 to produce analogue signals suitable for output by a loud-speaker 8 (step H).

The size of the DMM tables can be reduced by several ways. The most straightforward method is to translate $\bar{u}$ into capital letters prior the probability calculations. Another method is to cluster types of letters (bigrams or trigrams) and let them be presented by one state.

It will be readily appreciated that the embodiments described above use conditional probability to determine the most likely language of an incoming text message. The Dmm statistics that are pre-stored are used to determine, for each language, the probability that one character (or group of characters) follows another character (or group).

Figure 4:
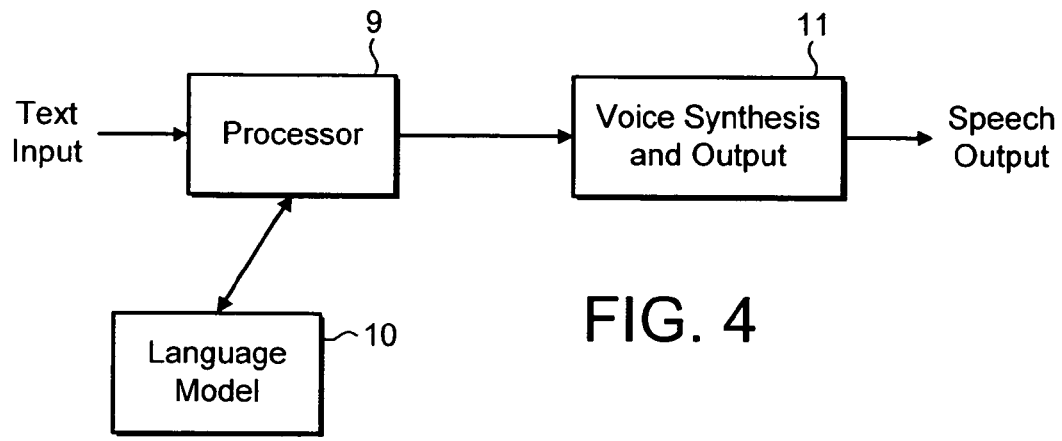
FIG. 4 illustrates a system embodying an aspect of the invention.
Figure 5:
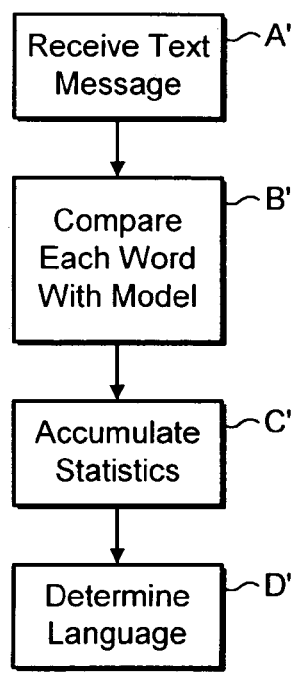
FIG. 5 illustrates the operation of the system illustrated in FIG. 4.

A system embodying another aspect of the present invention is shown in FIG. 4 and its operation illustrated in FIG. 5. The system includes a processor 9 which receives the incoming text message (step A'). A set of language models 10, such as the Tegic T9™ or Zi Corp™ models, is provided for comparison with the incoming text message. Each word of the text message is compared with the language models 10 (step B'), and the number of matches for each language is recorded (step C'). The language of the text message is then determined to be the language of the model which has the highest number of word matches. Preferably, the text language detection in accordance with this aspect of the invention uses a language model that is already provided in the device.

Using a language model which is already available in the device enables the device to be provided with language detection facilities without the need for adding complex processing and algorithms to be provided in the device. Other uses of such models are for text input prediction. Such models tend to be relatively simple dictionaries having the primary purpose of predicting keypad entry of text messages.

The invention claimed is:

1. A method of determining the language of a text message that comprises a plurality of words, the method comprising:

receiving an input text message consisting of a plurality of characters;

dividing the plurality of characters into a series of character groups, each consisting of n characters;

for each character group, except the last in the message, determining respective probability values for selected languages, each probability value being indicative of the probability that the character group concerned is followed by the next character group in the message in the language concerned;

for each language, accumulating the probability values determined for each character group in the message; and determining the language of the text message on the basis of the accumulated probability values.

2. A method as claimed in claim 1, wherein probability values are pre-stored in storage means and are retrieved therefrom.

3. A method as claimed in claim 1, wherein the probability values are determined by transition probability values of a discrete Markov model of each language.

4. A method as claimed in claim 3, wherein, for each language, the probability values are accumulated according to the equation:

$$\hat{\Lambda}_m = p(\Lambda_m) q_{u_1}^{(m)} \prod_{i=1}^{N-1} a_{u_i,u_{i+1}}^{(m)}$$

in which $\hat{\Lambda}_m$=accumulated probability for language m,
$p(\Lambda_m)$=a-priori probability for language m,
$q_{u_i}^{(m)}$=probability that the text message begins with character group $u_i$ for language m,
N=number of character groups in the text message, and
$a_{u_i,u_{i+1}}^{(m)}$=probability that character group $u_{i+1}$ follows character group $u_i$ in language m.

5. A method as claimed in claim 3, wherein for each language, the probability values are stored as probability values.

6. A method as claimed in claim 5, wherein, for each language, the probability values are accumulated according to the equation:

$$\hat{\Lambda}_m = \log(p(\Lambda_m)) + \log(q_{u_1}^{(m)}) + \sum_{i=1}^{N-1} \log(a_{u_i,u_{i+1}}^{(m)})$$

in which $\hat{\Lambda}_m$=accumulated probability for language m,
$\log(p(\Lambda_m))$=logarithm of a-priori probability for language m,
$\log(q_{u_i}^{(m)})$=logarithm of probability that text message begins with group $u_i$ for language m,
N=number of character groups in the text message,
$\log(a_{u_i,u_{i+1}}^{(m)})$=logarithm of probability that character group $u_{i+1}$ of the text message follows character group $u_i$ in language m.

7. A method as claimed in claim 1, wherein the number, n, of characters in each group is 2.

8. A method as claimed in claim 1, wherein the number, n, of characters in each group is 3.

9. A method as claimed in claim 1, wherein the number n, of characters in each group, is 1.

* * * * *

UNITED STATES PATENT AND TRADEMARK OFFICE
CERTIFICATE OF CORRECTION

PATENT NO. : 7,035,801 B2
APPLICATION NO. : 09/945663
DATED : April 25, 2006
INVENTOR(S) : Alberto Jimenez-Feltström It is certified that error appears in the above-identified patent and that said Letters Patent is hereby corrected as shown below:

Col. 4, Line 1: Change "ūhas" to --ū has--

Col. 4, Line 13: Change "of u." to --of ū.--

Col. 5, Line 14: Change "string u" to --string ū--

Claim 4, Line 11: Change " $q_{u_l}^{(m)} =$ " to -- $q_{u_1}^{(m)} =$ --

Claim 4, Line 12: Change "$u_l$" to --$u_1$--

Claim 6, Line 11: Change " $\log(q_{u_l}^{(m)}) = \text{logarithm}$ " to -- $\log(q_{u_1}^{(m)}) = \text{logarithm}$ --

Claim 6, Line 12: Change "$u_l$" to --$u_1$--

Claim 6, Line 14: Change " $\log(\alpha_{u_l, u_{l+1}}^{(m)}) = \text{logarithm}$ " to -- $\log(\alpha_{u_l, u_{l+1}}^{(m)}) = \text{logarithm}$ --

Signed and Sealed this

Ninth Day of January, 2007

JON W. DUDAS
*Director of the United States Patent and Trademark Office*